United States Patent [19]

Barker et al.

[11] Patent Number: 4,674,040

[45] Date of Patent: Jun. 16, 1987

[54] MERGING OF DOCUMENTS

[75] Inventors: Barbara A. Barker, Round Rock; Irene H. Hernandez; Rex A. McCaskill, both of Austin, all of Tex.

[73] Assignee: International Business Machines Corporation, Armonk, N.Y.

[21] Appl. No.: 686,566

[22] Filed: Dec. 26, 1984

[51] Int. Cl.⁴ .............................................. G06F 3/153
[52] U.S. Cl. ..................................... 364/300; 340/734
[58] Field of Search ........................................ 340/734; 364/200 MS File, 300 MS File, 900 MS File

[56] References Cited

U.S. PATENT DOCUMENTS 4,445,795 5/1984 Levine et al. ................... 364/300 X Primary Examiner—Raulfe B. Zache
Attorney, Agent, or Firm—J. H. Barksdale

[57] ABSTRACT

A method of, and system for, merging a portion of one document into another and providing for current viewing and on line editing. During preparation of a document, a paragraph from another document can be included in the document being prepared by referencing the other document and paragraph. The result of referencing is inclusion of the paragraph, a view of the document being prepared, and a document including the included paragraph which is dynamically editable. If the paragraph is edited, an operator decision is to be made as to whether the other document is to be updated according to the editing.

5 Claims, 10 Drawing Figures

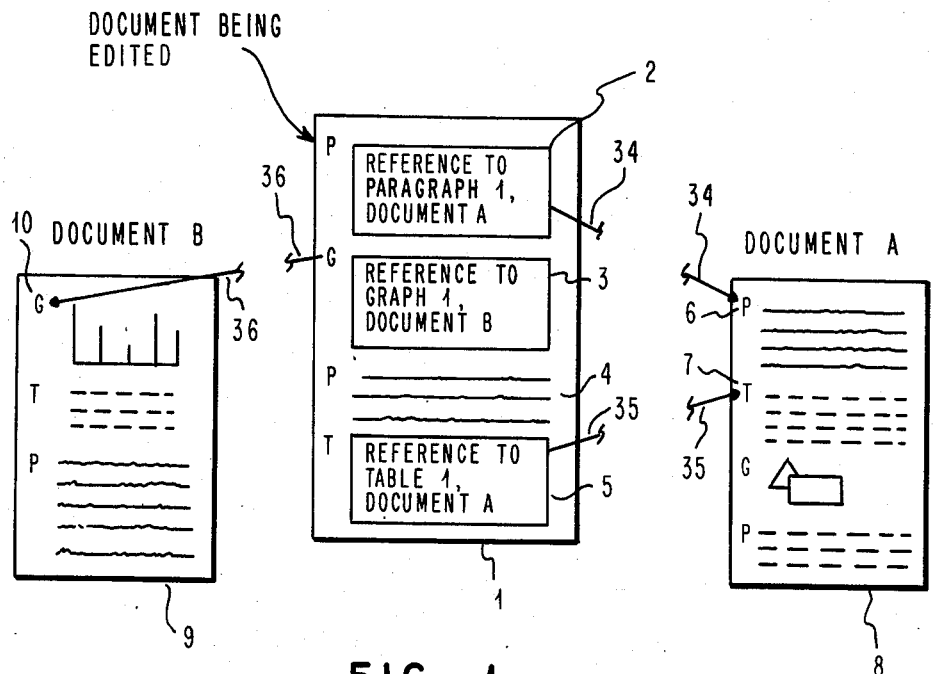
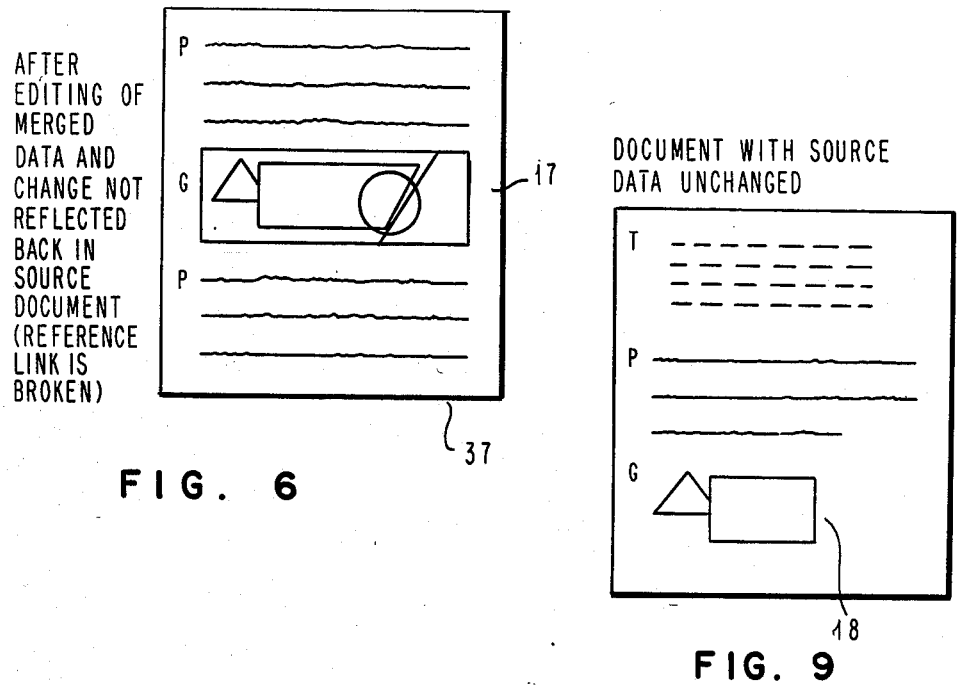

MERGED DATA BEING EDITED
BEFORE EDITING OF MERGED DATA
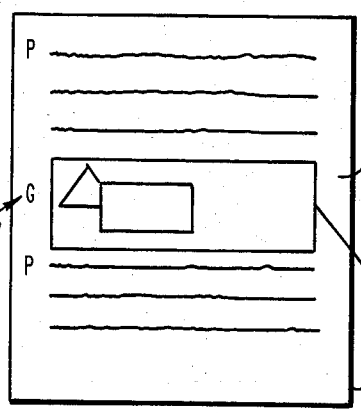
OBJECT SELECTED
FIG. 4
AFTER EDITING OF MERGED DATA AND CHANGED REFLECTED BACK IN SOURCE DOCUMENT
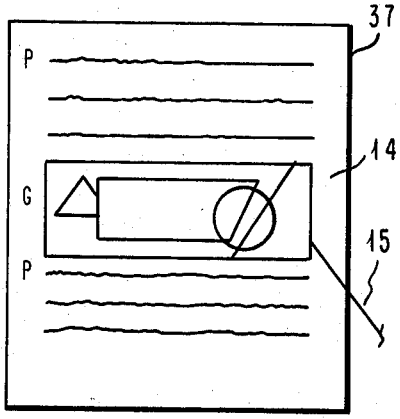
FIG. 5
DOCUMENT WITH SOURCE DATA
FIG. 7
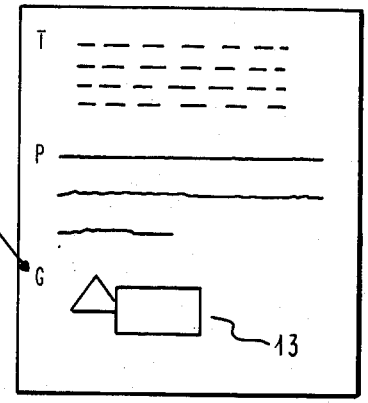
DOCUMENT WITH SOURCE DATA CHANGED
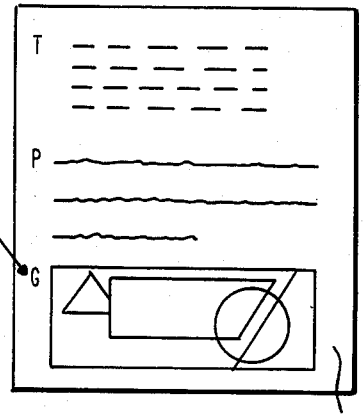
FIG. 8

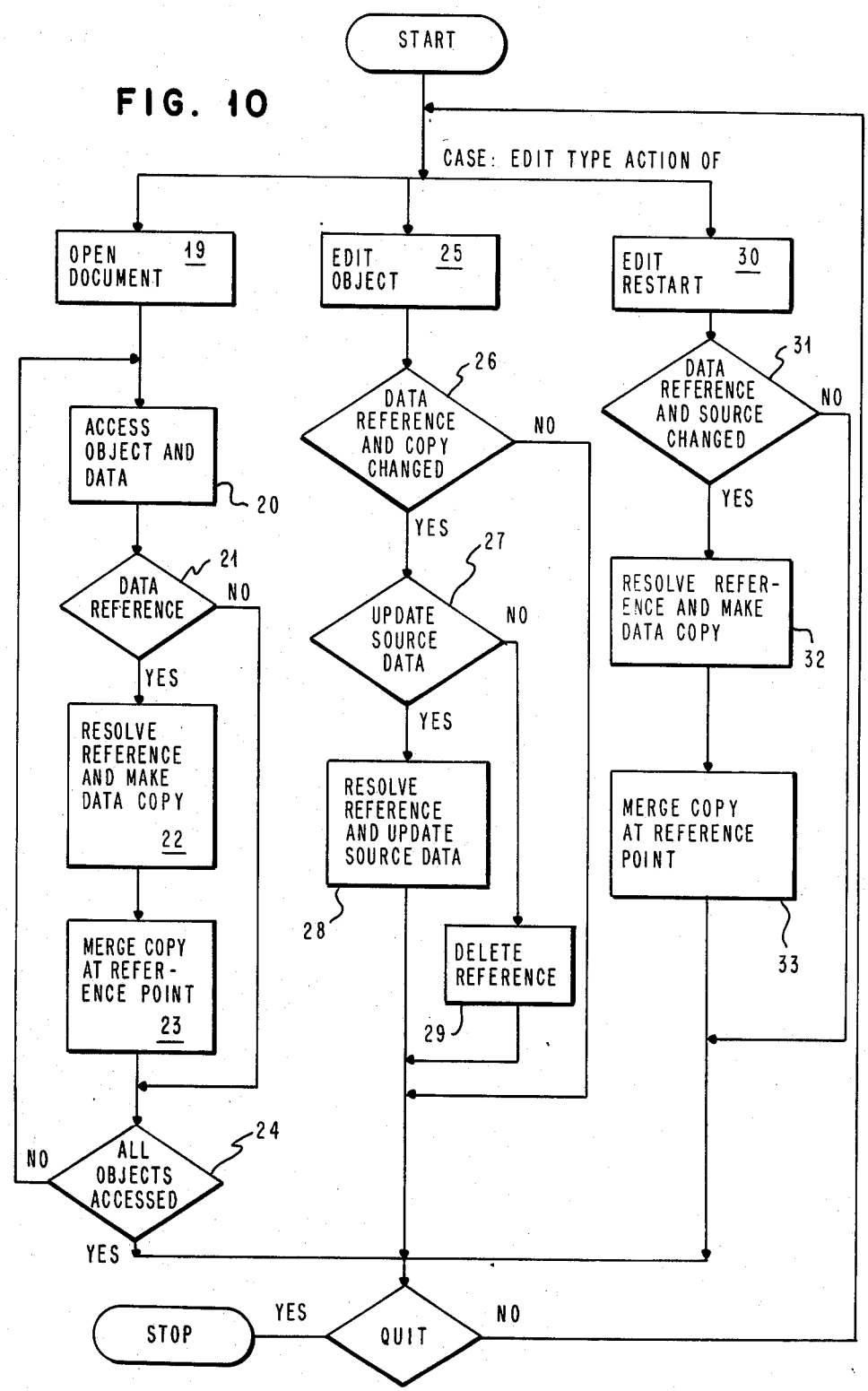

MERGING OF DOCUMENTS

DESCRIPTION

Technical Field

This invention relates generally to merge operations, and more specifically to merging portions of one document into another while providing for current viewing and on line editing.

BACKGROUND OF THE INVENTION

Document assembly has been accomplished in many ways. The most elementary assembly operation is with a typewriter and wherein pages are keyed and printed sequentially. With the advent of correcting typewriters, minor errors were easily corrected. When magnetic tape/card typewriters were introduced, minor errors were readily corrected, and major changes or document reassembly in terms of changing the order of paragraphs, moving paragraphs, etc., were made much easier for an operator to handle. In addition, portions of different documents could be merged to form a new document.

Popular in the marketplace today are keyboard/display word processing systems, and keyboard/display standalone, and host connected, computer workstations. With either of these systems, merge operations for document assembly are readily managed. However, merging is a batch operation in that an operator or user must enter one document and mark the location of insertion, and then enter the other document and mark the portion to be moved or copied.

The introduction of windowing systems simplified merge to a degree in that several documents in separate windows could be simultaneously viewed. The user could then cut and paste data from one document window into another document window to accomplish document assembly. The problem with cut and paste is that the data in the assembled document is "dead" data. That is, the data is printed or displayed when the document is printed or displayed, but the user cannot edit the data and have the changes reflected back in the source document. If the editor does not understand the format of the merged data, the user must return to the source document, reedit the data, cut the data from the source document and paste the data back into the assembled document.

Based on the above, merge in a batch, or cut and paste, environment is an old concept. Also, referencing of data, such as with the include operation in the IBM Displaywriter System, is old. The above art is pertinent to varying degrees, but falls short of either anticipating the instant invention or rendering the instant invention obvious. The instant invention presents an advance over the prior art in that both dynamic, on line merging of fully editable data from one document into another, and two way linkage of the data between the documents is available to an operator through interactive referencing of data. In addition references are interactively resolved and the contents of the referenced data are shown on line in the assembled document. The advantages of the above advances are improved operator flexibility, preservation of data integrity, and system useability.

DISCLOSURE OF THE INVENTION

A unique method of, and system for, merging a portion of one document into another is provided in order to have a merged display and real time editing capability. During preparation of a document, it may be desirable to include a paragraph from another document. Such an operation is performed by referencing the paragraph from the other document. Referencing will cause the paragraph to be included with the document being prepared, create a two way linkage between the documents, and permit the document being prepared, along with the included paragraph to be edited. Editing of the paragraph will cause an operator decision to be made as to whether the other document is to be updated according to the editing. Brief Description of the Drawing

BRIEF DESCRIPTION OF THE DRAWING

FIG. 1 illustrates a display screen with a document to be assembled. The document contains references and actual data.

FIG. 2 illustrates a document containing graphic data being referenced by the document in FIG. 1. The document in FIG. 2 can either be resident on a storage medium or in a hidden window.

FIG. 3.illustrates a document containing the paragraph and table data being referenced by the document in FIG. 1. As in FIG. 2 the document can either be resident on a storage medium or in a hidden window.

FIG. 4 illustrates an assembled document with a graphic object being selected for editing.

FIG. 5 illustrates the assembled document with the editing of the graphic object complete and the reference link preserved.

FIG. 6 illustrates the assembled document with the editing of the graphic object complete and the reference link broken. The source of the graphic data will now be stored with the assembled document.

FIG. 7 illustrates the document containing the source data for the graphic object in the document in FIG. 4. This document is either resident in a hidden window or on a storage medium.

FIG. 8 illustrates the document containing the source data for the graphic object in the document in FIG. 5. The source data has been updated to reflect the edit changes indicated in FIG. 5.

FIG. 9 illustrates the document containing the original source data for the graphic object in the document in FIG. 6. The source data has not been updated to reflect the edit changes indicated in the document in FIG. 6.

FIG. 10 is a flow chart illustrating operator and system operations performed in carrying out the instant invention.

BEST MODE FOR CARRYING OUT THE INVENTION

For a more detailed understanding of this invention, reference is first made to FIG. 1. In this figure there is illustrated a screen 1 which it is to be assumed is being displayed on an all points addressable cathode ray tube display screen of a device controlled standalone or host connected computer work station or system. Display and control of window 1 can be by means of an application program useable by the workstation.

When the user or operator is operating on the screen, paragraph 2, graph 3, paragraph 4, table 5 or any other location on the screen can be cursored. The mechanism for cursoring a location on the screen is unimportant as far as this invention is concerned.

The line from paragraph 2 to paragraph 6, denoted by arrowed line 34, represents the reference link created by the operator prior to the display of the data for paragraph 2 on screen 1. Arrowed lines 35 and 36 also represent reference links created between graph 3 and graph 10 and table 5 and table 7. The data in paragraph 2, graph 3 and table 5 are local copies of the data in paragraph 6, graph 10 and table 7. The data in paragraph 4 is actual data and not a copy of other data as no reference link has been created by the operator.

As has been pointed out, the data in an assembled document that contains a reference is really a copy of original data that is stored in some location external to the assembled document. Graph 11 in FIG. 4 has been selected for editing by the operator. The mechanism for selecting an object within the window is also unimportant as far as this invention is concerned. Graph 13 is the source of the data for graph 11. The link between these two objects is represented by the reference link, denoted by arrowed line 12. If it had been the case that graph 13 had been edited by the operator prior to the selection of graph 11 for editing, the system would have updated the data for graph 11 prior to displaying the document on screen 37. Graph 14 is the result of the operator editing the copy of the data in graph 11. After the editing of graph 11 is completed, the system provides the operator the option of having the changes in graph 14 applied to the data of graph 13. If the user elects to apply the changes to the source data in graph 13, the system will replace the data with a copy of the data for graph 14, and the result will be graph 16. If the document with the source data is not displayed in a hidden window, the operator will not see that the changes have been applied until the source document is next edited. Link 15 shows that the data reference from graph 14 to graph 16 has been maintained by the system.

If the operator or user does not elect to apply the changes in graph 14 to the source data in graph 13, the data reference between the two objects will be deleted by the system and link 12 will be broken. The document with the source data will remain unchanged as illustrated by the fact that graph 18 and graph 13 are the same object.

Reference is next made to the flow chart of FIG. 10 which illustrates operator and system operations for assembling a document via "live" data referencing and two way data links.

First, the operator initiates editing of the document into which data is to be merged. Since the action to occur involves opening the document and displaying the contents to the user, the flow of control is through block 19. Each object to be displayed and its data is accessed as indicated by block 20. If the object's data contains a reference, the system resolves this reference by using information stored with the object which has the name of the document and the name of the object within that document where the source data can be located. Once the system locates the source data, the system makes a copy of the data to be used while the document is being actively edited. This copy of the data is merged inline in the document at the data reference point. These actions are indicated by blocks 21, 22 and 23. As indicated by block 24, the above steps will be repeated as long as object data needs to be accessed.

If the action to occur is editing an object in the assembled document, the flow of control is through block 25. If the object edited contains a data reference and the editing changed the object's data, then the system asks the user if the source data should be updated to reflect the edit changes. This action is depicted by blocks 26 and 27. If the source data is to be updated, the system resolves the data reference in the same way as when the object was accessed the first time, deletes the original data and moves an updated copy of the data to the source. Block 28 indicates this action occurring. If the user does not want to update the source data, the system deletes the reference as indicated in block 29.

When editing of the assembled document is restarted by the system because some external interruption occurred causing editing to be suspended, the flow of control is transferred to block 30. If the system detects that the source data of a referenced object has been changed during the interruption, the system goes through the steps of resolving the reference, making a new copy of the source data and merging the data inline in the document at the reference point. The occurrence of these steps is indicated in blocks 31 through 33.

Set out below is an illustration of an application program (editor) useable by a processor in the workstation or host for causing a merging of data from a source document into an assembled document through object data referencing. This program is in program design language from which source and machine code are derivable. In the following it is to be assumed that the workstation is under at least keyboard device control.

```
REPEAT
.
.
(*Initial document editing started*)
.
.
.
REPEAT
CALL GET_OBJECT
CALL READ_OBJECT_DATA
IF OBJECT_DATA CONTAINS A REFERENCE THEN
CALL RESOLVE_REF(SOURCE_LOC,
SOURCE_DATA_PTR)
CALL MAKE_COPY(SOURCE_DATA_PTR,
COPY_DATA_PTR)
CALL MERGE_DATA(REF_LOC, COPY_DATA_PTR)
ENDIF
UNTIL ALL OBJECTS ARE ACCESSED.
.
.
(*Interactive edit action occurs*)
IF OBJECT EDITED CONTAINS A REFERENCE THEN
IF OBJECT DATA CHANGED THEN
PROMPT FOR LOCAL OR ORIGINAL SOURCE CHANGE
IF ORIGINAL SOURCE CHANGE
THEN
CALL RESOLVE_REF(SOURCE_LOC,
SOURCE_DATA_PTR)
CALL DELETE_DATA(SOURCE_DATA_PTR)
CALL MAKE_COPY(COPY_DATA_PTR,
SOURCE_DATA_PTR)
ELSE (*MAKE THE COPY THE ACTUAL DATA*)
CALL DELETE_REF(OBJECT_PTR) (*BREAK LINK*)
ENDIF
ENDIF
ENDIF
.
.
(*Restart interrupted edit of document*)
IF OBJECT_DATA CONTAINS A REFERENCE THEN
IF SOURCE_DATA HAS BEEN CHANGED THEN
CALL RESOLVE_REF(SOURCE_LOC,
SOURCE_DATA_PTR)
CALL MAKE_COPY(SOURCE_DATA_PTR,
COPY_DATA_PTR)
CALL MERGE_DATA(REF_LOC, COPY_DATA_PTR)
ENDIF
ENDIF
```

-continued

UNTIL EDIT SESSION COMPLETE

During an interactive editing session, one or more documents may be simultaneously opened for editing by a user. When a document is opened, the editor must access the data for each object, and create an external representation of the data that can then be displayed or printed. The editor determines how much data must be accessed before document editing can be initiated. For each object that is to be displayed or printed, the editor calls a routine to locate the object on the storage medium (CALL GET_OBJECT) and to read in that object's data (CALL READ_OBJECT_DATA). If the object's data contains a reference to the data of another object, the editor calls a routine to resolve the data reference (CALL RESOLVE_REF). The input to this routine is the name of the source file and object whose data is being referenced; the variable (SOURCE_LOC) contains this information. The output of the routine is a pointer to a buffer containing the source data (SOURCE_DATA_PTR). The editor then calls a routine to make a copy of the source data (MAKE_COPY). The input to this routine is the pointer to the source data (SOURCE_DATA_PTR) and the output is a pointer to the copy of the source data (COPY_DATA_PTR). The copy of the source data is then used by the routine that merges the copy of the data inline in the assembled document (CALL MERGE_DATA). As input, the merge routine requires a pointer to the copy of the data and the document address at which the data is to be merged (REF_LOC). The editor also saves the information needed to update the local copy of the data. This information is needed because if the editor detects that the source data has been updated, the local copy of the data must be updated before the operator resumes editing of the assembled document.

If during the editing session, the data of an object containing a data reference is edited, the editor asks the user if the edit changes are to be applied to the original source data. If the user wants the original source to change, the editor calls a routine (CALL RESOLVE_REF) to locate the data belonging to the source object. The SOURCE_DATA is then deleted by a routine called DELETE_DATA. The editor makes a copy of the data belonging to the object containing the reference (COPY_DATA) and moves this data into the buffer pointed to by the SOURCE_DATA_PTR. If the user does not want to change the original source, the editor calls a routine to delete the reference information and break the link between the object data and the source data (CALL DELETE_REF).

If the source of an object containing a data reference changes during the edit session, then the editor must update the local copy of the data before the local object is redisplayed or printed. The steps are as follows: call a routine to resolve the reference (CALL RESOLVE_REF), make a copy of the updated source data (CALL MAKE_COPY), and finally merge the copy of the data inline at the point the reference occurs.

In summary, a unique method of, and system for, merging a portion of one document into another is provided in order to have a merged display and real time editing capability. During preparation of a document, it may be desirable to include a paragraph from another document. Such an operation is performed by referencing the paragraph from the other document. Referencing will cause the paragraph to be included with the document being prepared, create a two way linkage between the documents, and permit the document being prepared, along with the included paragraph to be edited. Editing of the paragraph will cause an operator decision to be made as to whether the other document is to be updated according to the editing.

While the invention has been particularly shown and described with reference to a preferred embodiment, it will be understood by those skilled in the art that various changes in form and detail may be made without departing from the spirit and scope of the invention.

We claim:

1. A method for merging a portion of one document into another document, said method comprising:
    (a) including a reference in said another document to said portion; and
    (b) causing said portion to be merged with said another document and displayed in merged form.

2. A method according to claim 1 including causing said portion to be merged with said another document in editable form.

3. A method according to claim 1 including linking said documents following referencing said portion.

4. A method according to claim 1 including causing said one document to be updated if said portion is edited following a merging of said portion with said another document.

5. A method according to claim 1 wherein said including a reference in said another document to said portion includes specifying said one document and said portion.

* * * * *